(12) United States Patent
Takaha et al.

(10) Patent No.: US 6,607,155 B2
(45) Date of Patent: Aug. 19, 2003

(54) MAGNETIC TAPE CASSETTE

(75) Inventors: Satoru Takaha, Mito (JP); Yasufumi Hashimoto, Hitachinaka (JP)

(73) Assignee: Victor Company of Japan Ltd., Kanagawa-Ken (JP)

( * ) Notice: Subject to any disclaimer, the term of this patent is extended or adjusted under 35 U.S.C. 154(b) by 27 days.

(21) Appl. No.: 09/963,405

(22) Filed: Sep. 27, 2001

(65) Prior Publication Data

US 2002/0040944 A1 Apr. 11, 2002

(30) Foreign Application Priority Data

Sep. 28, 2000 (JP) ........................................ 2000-295988

(51) Int. Cl.$^7$ ............................................ G11B 23/087
(52) U.S. Cl. ..................... 242/344; 242/345; 242/346; 242/347; 360/132
(58) Field of Search .......................... 242/344, 345, 242/346, 347; 360/132

(56) References Cited

U.S. PATENT DOCUMENTS

| | | | | |
|---|---|---|---|---|
| 3,638,955 A | * | 2/1972 | Wada | 242/344 |
| 4,091,426 A | * | 5/1978 | Umeda | 242/344 |
| 4,343,024 A | * | 8/1982 | Kawai | 242/344 |
| 4,989,111 A | * | 1/1991 | Sato | 242/344 |
| 4,993,661 A | * | 2/1991 | Tollefson | 242/344 |
| 5,657,936 A | * | 8/1997 | Ohgi et al. | 242/344 |

FOREIGN PATENT DOCUMENTS

| | | |
|---|---|---|
| EP | 0286355 | 10/1988 |
| EP | 0359214 | 3/1990 |
| EP | 1059639 | 12/2000 |
| JP | 4-53078 | 2/1992 |
| JP | 63-249991 | 10/1998 |
| JP | 11-120736 | 4/1999 |

* cited by examiner

Primary Examiner—William A. Rivera
(74) Attorney, Agent, or Firm—Connolly Bove Lodge & Hutz LLP

(57) ABSTRACT

A magnetic tape cassette for use in an apparatus having a light source and a light sensor (5a, 5b) for detecting a tape end by the difference of light transmittance of a tape. The magnetic tape cassette (1) is composed of a cassette housing for having a transparent or semi-transparent upper half (1b) and a lower half (1a), and the reel being connected with the tape, and a light exit (7A, 7B) being opposed to the light sensor (5a, 5b) when the tape cassette is loaded to a predetermined position in the apparatus, for passing light from the light source to the light sensor through the light exit, wherein a light path (4a, 4b) of the light emitted from the light source crosses a travel path of the tape, a light-shielding member (2a, 2b) for limiting the light emitted from the light source, placed contiguous to the light exit, and a rib (81, 83) being formed in the upper half and the lower half (1a, 1b) wherein a plurality of triangular shaped prisms (83a) is formed serially on at least one side of the rib (83).

2 Claims, 7 Drawing Sheets

MAGNETIC TAPE CASSETTE

BACKGROUND OF THE INVENTION

1. Field of the Invention

The present invention relates to a magnetic tape cassette for used in an apparatus having a light source and a pair of light sensors to detect a tape end of the magnetic tape cassette in which a cassette housing is combined with transparent or semi-transparent upper half and lower half.

2. Description of the Related Art

The assignee of the present invention disclosed a magnetic tape cassette (hereinafter referred to as "tape cassette") for preventing an erroneous detection of a tape end irrelevant to material of a cassette housing and for being capable of mass production, and for having a color of higher transparency which color the manufacturer intends for such the tape cassette. The tape cassette in accordance with the related art is described as follows with reference to FIGS. 9 through 12.

FIG. 9 is a plan view of a lower half of a tape cassette for having a light-shielding member for preventing an erroneous detection of the tape end caused by receiving too much light at a light sensor incorporated in an apparatus such as VCR.

In FIG. 9, a tape cassette 1 is composed of a lower half 1a and an upper half 1b (not shown), and includes a room 20 for containing a take-up (TU) reel 23 on which a magnetic tape is winded up, another room 21 for containing a supply (SP) reel 24 on which a magnetic tape is supplied to the TU reel 23, a light hole 3 for inserting a light source incorporated in an apparatus not shown, a pair of light sensors 5a and 5b incorporated in the apparatus which receive light emitted from the light source through a pair of light paths 4a and 4b respectively, a light exits 701 and 702 for passing the light emitted from the light source, ribs 801 and 802 formed together with the lower half 1a, a light shielding member 2a and 2b for limiting an irregular reflection caused by the light emitted from the light source from coming into the light sources 5a and 5b. The portion A and B in FIG. 9 show the position where the light shielding members 2a and 2b are placed in the tape cassette 1.

In FIG. 9, the light emitted from the light source inserted in the light hole 3 reaches the light sensors 5a and 5b through the light paths 4a and 4b respectively. On the other hand, the both ends of the magnetic tape (not shown) are connected to the SP reel 24 and TU reel 23 respectively through an intermediary leader tape (not shown). The magnetic tape forms a tape travel path (not shown) to connect to the SP reel 24 and the TU reel 23, wherein the tape travel path crosses the light paths 4a and 4b.

Generally, in the tape cassette made by low light transmittance material (such as black colored material), the light emitted from the light source reaches to the light sensor 5a and 5b incorporated in the VCR through the light paths 4a and 4b respectively. As the leader tape is not having a magnetic powder, the light emitted from the light source can reach to the light sensors 5a and 5b through the leader tape. To the contrary, the magnetic tape blocks the light emitted from the light source. As a result, the tape end can be detected by the difference of amount of light received at the light sensors 5a and 5b when the leader tape passes the light emitted from the light source to the light sensors 5a and 5b.

FIG. 10 is a cross-sectional view of the tape cassette 1 having an upper half 1b and a lower half 1a with a thickness T, made of a transparent or a semi-transparent material without having the light shielding member 2a between the light hole 3 and the light sensor 5a, wherein the light source LS is inserted in the light hole 3.

In FIG. 10, the light emitted from the light source LS will be reflected irregularly inside the tape cassette 1 as an irregular light 6. As the light shielding member 2a is not placed between the room 20 for the TU reel 23 and the light sensor 5a, the irregular light 6 will also reach to the light sensor 5a.

In case that the tape cassette 1 consists of an upper half 1b and a lower half 1a made of a transparent or semi-transparent material, the light sensors 5a and 5b may receive the irregular light 6 even when the magnetic tape crosses the light paths 4a and 4b that the apparatus may erroneously determine that the tape end has been detected.

Accordingly, the assignee of the present invention discloses a tape cassette shown in FIG. 11 having a light shielding member 2a placed at the rib 801 of the tape cassette 1.

FIG. 11 is a cross-sectional view of the tape cassette 1 shown in FIG. 10 for having the light shielding member 2a between the light hole 3 and the light sensor 5a. As shown in FIG. 11, the irregular light 6 is blocked by the light shielding member 2a and will not reach to the light sensor 5a.

FIGS. 10 and 11 show the relation between the room 20 for the TU reel 23 and the light sensor 5a, but of course, the relation of the room 20 and the light sensor 5a can be applied to the relation of the other room 21 for the SP reel 24 and the light sensor 5b as well.

FIG. 12 is a perspective view of the portion A shown in FIG. 9 for explaining the light shielding member 2a. In FIG. 12, the light shielding member 2a has a light window 11 to pass only the light emitted from the light source through the light path 4a, and blocks the irregular light 6. The light shielding member 2a is fixed at the rib 801 by an adhesive.

As described above, the irregular light 6 reflected diffusely inside the upper half 1b and the lower half 1a can be blocked by placing the light shielding member 2a and 2b on the light paths 4a and 4b at the ribs 801 and 802 of the tape cassette an a be prevented from reaching to the light sensors 5a and 5b.

However, as the upper half 1b and the lower half 1a are being made of a transparent or semi-transparent material, the light emitted from the light source LS may pass through the material itself as an irregular light 6b and radiated from the edge of the upper and lower half (the edge 100), and eventually reaches the light sensor 5a. This irregular light 6b is difficult to be blocked by only the light shielding member 2a.

Such the irregular light 6b radiated from the edge 100 may reach to the light sensor 5a and the VCR may erroneously detect the tape end. In order to prevent the VCR from this malfunction to erroneously detecting the tape end, the irregular light 6b should be blocked. This may happen to the portion B in FIG. 9 that such the irregular light 6b may reach to the light sensor 5b, which also should be blocked.

SUMMARY OF THE INVENTION

Accordingly, in consideration of the above-mentioned problems of the related art, an object of the present invention is to provide a magnetic tape cassette used in an apparatus having a light source (LS) and a light sensor (5a, 5b) for detecting a tape end of a magnetic tape being loaded therein, the magnetic tape cassette including, a cassette housing being formed by combining an upper half (1b) and a lower half (1a) made of transparent or semi-transparent member, wherein the cassette housing is equipped with a reel being connected to the magnetic tape through an intermediary leader tape having higher light transmittance for winding up the magnetic tape, a light exit (7A, 7A1, 7A2) being opposed to the light sensor (5a, 5b) when the magnetic tape cassette is loaded to a predetermined position in the apparatus, for passing light from the light source (LS) to the light sensor (5a, 5b) through the light exit (7A, 7A1, 7A2), wherein a light path (4a, 4b) of the light emitted from the light source (LS) crosses a travel path of the magnetic tape, and a rib (8) being formed in the upper half (1b) and the lower half (1a) wherein a plurality of triangular shaped prism (8a) is formed serially on at least one side surface of the rib contiguous to the light exit (7A, 7A1, 7A2).

Other object and further features of the present invention will be apparent from the following detailed description when read in conjunction with the accompanying drawings.

BRIEF DESCRIPTION OF DRAWINGS

FIG. 6 (B) is an elevational view of a substantial part of the V-shaped rib shown in FIG. 6 (A) according to the third embodiment of the present invention.

DETAILED DESCRIPTION OF THE PREFERRED EMBODIMENTS

The present invention is to provide a magnetic tape cassette (hereinafter referred to as "tape cassette") having a light shielding member with a window for limiting an amount of light, and having a rib and a holding portion both of which are formed on an upper half and a lower half, wherein the holding portion is formed in a predetermined distance from the rib to hold the light shielding member contiguously to a light exit of the tape cassette. The tape cassette has a structure for holding the light shielding member by the rib and the holding portion. The rib is at least provided with a plurality of prisms of which cross-sectional view is a triangular shaped, on at least one side thereof to limit an irregular light passing through a transparent or semi-transparent upper and lower half of the tape cassette being exposed to a light sensor from an edge of the rib. Accordingly, the tape end of the tape cassette can accurately be detected.

A tape cassette in accordance with the present invention is utilize for an apparatus having a tape end detecting function of the tape cassette and will be described below as a tape cassette of the "VHS" (Registered trademark) format system for a preferred embodiment of the present invention.

[First Embodiment]

Figure 1:
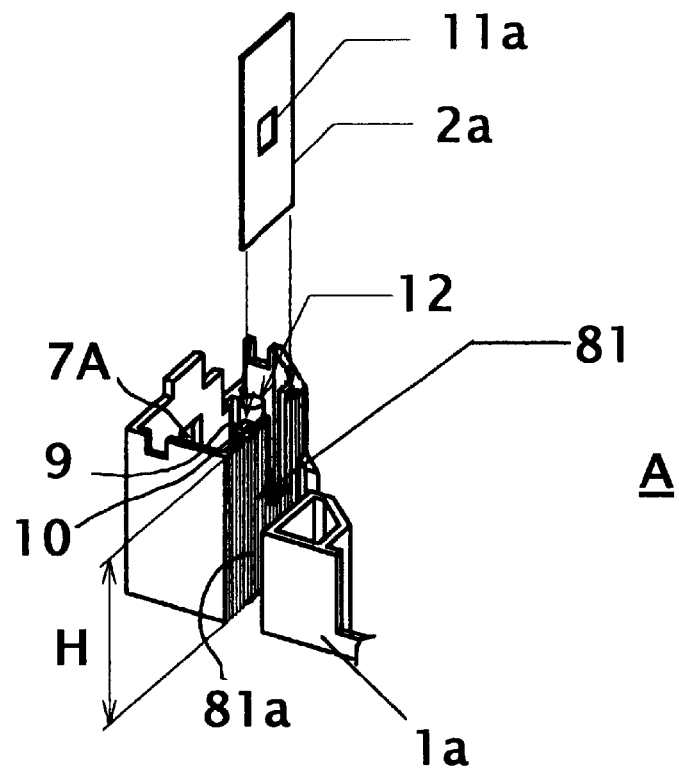
FIG. 1 is a perspective view of a substantial portion of a lower half of a tape cassette according to a first embodiment of the present invention, wherein a light shield is placed.
Figure 9:
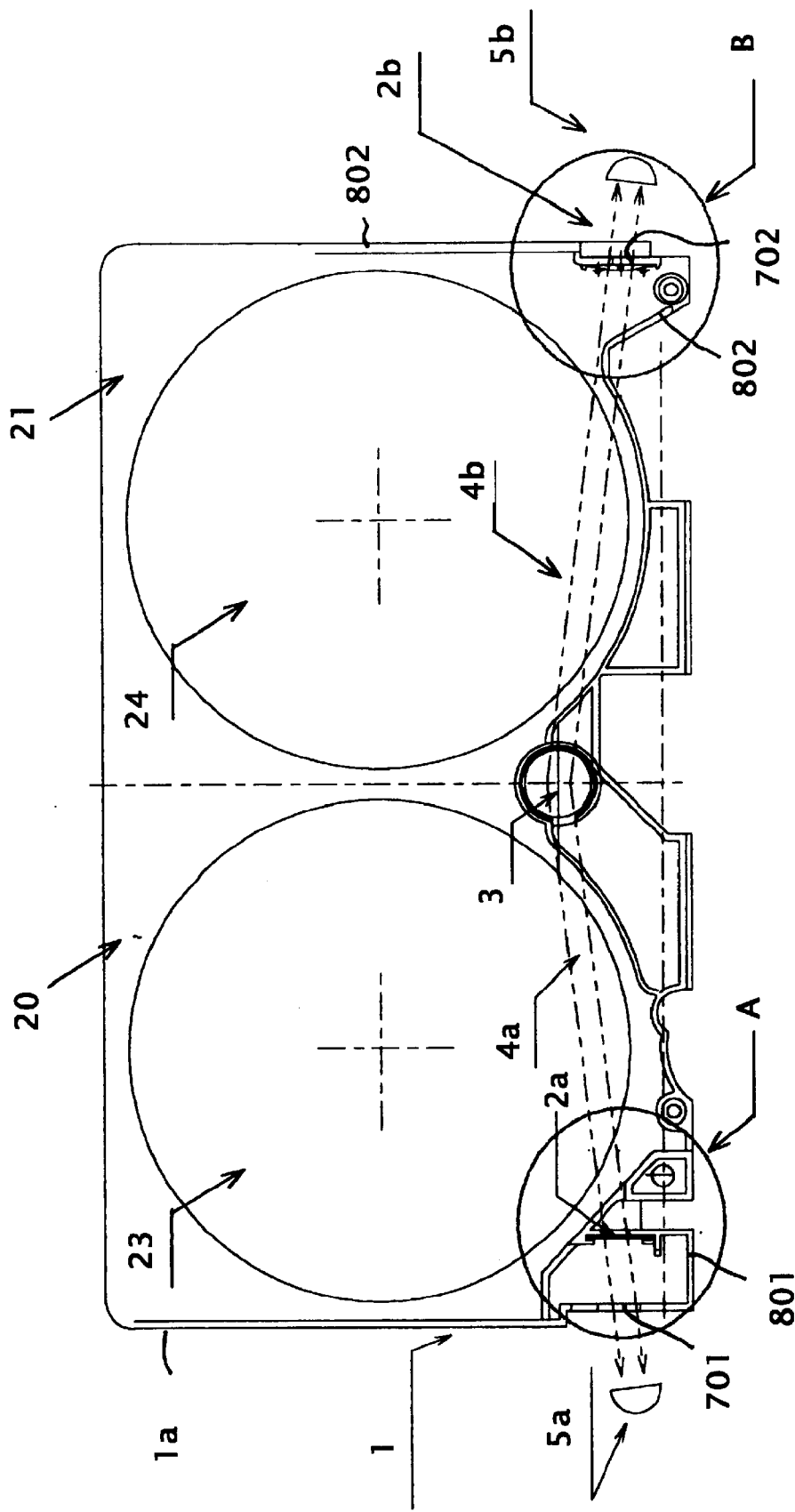
FIG. 9 is a brief plan view of a lower half of a tape cassette for explaining a light shield for preventing malfunction of detecting tape end caused by receiving too much light at a light sensor incorporated in an apparatus according to the prior art.
Figure 10:
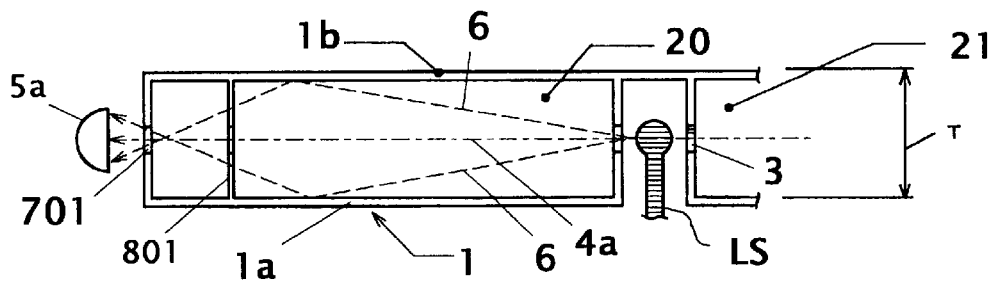
FIG. 10 is a cross-sectional view of the tape cassette without having the light shield between the light hole and the light sensor according to the prior art.
Figure 11:
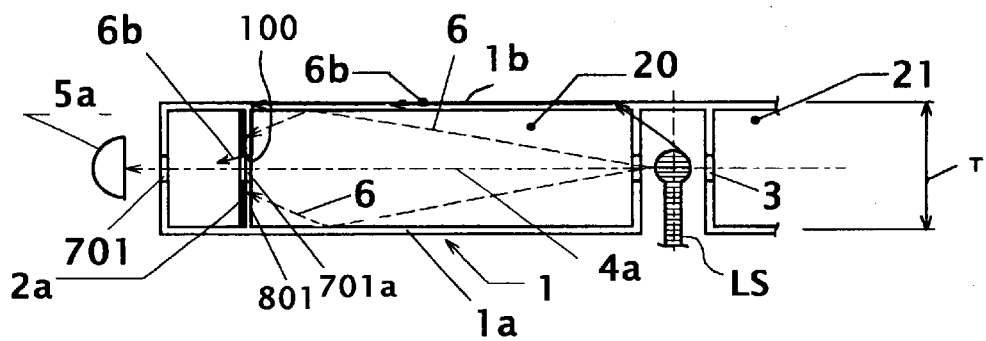
FIG. 11 is a cross-sectional view of the tape cassette having the light shield between the light hole and the light sensor according to the prior art.
Figure 12:
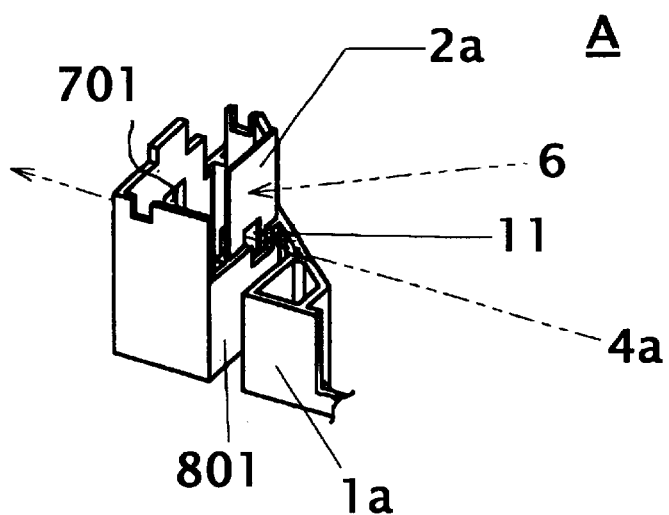
FIG. 12 is a plan view of the substantial portion of the lower half of the tape cassette according to the prior art.

FIG. 1 is a perspective view of a substantial portion of a lower half of a tape cassette according to a first embodiment of the present invention, wherein a light shielding member is placed. FIG. 1 also corresponds to the portion of lower half of the tape cassette shown by the circled area A in FIG. 9.

In FIG. 1, the portion A of a lower half 1a of a tape cassette comprises a light shielding member 2a having a light window 11a to limit the light emitted from the light source not shown, a light exit 7A formed in the lower half 1a for passing the light emitted from the light source to a light sensor 5a not shown, a rib 81 having a height "H" formed in the portion A of the lower half 1a, a plurality of prisms 81a of which cross-sectional view is a triangular shaped forming vertically on the opposite side of the light exit 7A, a holding portion 9 formed with the rib 81, a slit 10 forming on the side opposed to the holding portion 9, a holding member 12 for holding the light shielding member 2a together with the holding portion 9.

As the light shielding member 2a is inserted in the slit 10 between the holding portion 9 and the rib 81, the light shielding member 2a can be hold stably. Additionally, the slit 10 has a "L" shaped corner so that it can hold the light shielding member 2a at the narrow portion surrounded by the rib 81 with thinner rib of the lower half 1a.

Figure 2:
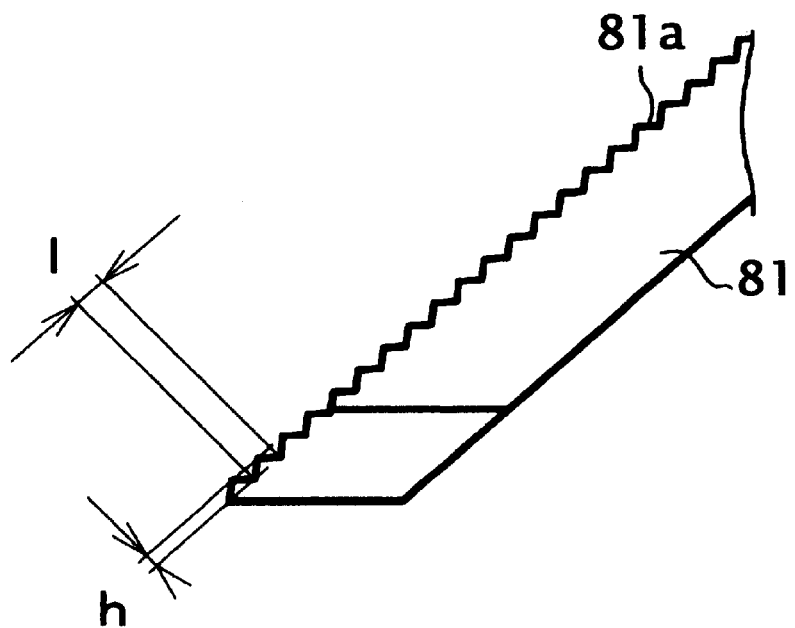
FIG. 2 is a cross-sectional enlarged view of the substantial part of a rib shown in FIG. 1 according to the first embodiment of the present invention.

FIG. 2 is a cross-sectional enlarged view of a substantial part of the rib 81. In FIG. 2, the size of the prism 81a is shown as "h" in height (=0.1 mm) and "l" in width (=0.1 mm). The prism 8a is molded together with the rib 81 of the lower half 1a.

The height "H" for the rib 81 is set to be taller than a half of a thickness "T" of the whole tape cassette. In case of "VHS" format tape cassette, the thickness "T" is 25 mm and the height "H" of the rib 81 is set to be more than 12.5 mm. According to this structure, deformation of the light shielding member can be minimized, and the lower half 1a and the upper half (not shown) of the tape cassette can be combined firmly together.

The holding member 12 holds the light shielding member 2a being inserted in the slit 10 of the holding portion 9. The holding member 12 can be formed in columnar shape. When using more flexible material than plastic (such as bonded textile etc.) for the light shielding member 2a, the holding member 12 can be formed more closer to the holding portion 9. In FIG. 1, the height of the holding portion 9 is described to have the same height of the rib 81 for explanation but it should not block the light path 4a (not shown in FIG. 1) leading to the light exit 7A. As long as it stably holds the light shielding member 2a and does not block the light path 4a, the height of the holding member 9 can be set freely.

Further, the rib 81 is desirably having a height taller than the half of thickness "T" of the tape cassette in both sides of the light exit 7A as shown in FIG. 1 but the rib 8 may have an uneven height in relation to the light exit 7A, i.e. one side taller than the other.

In addition, the holding member 12 is not necessary to be a columnar shaped but it can also be a rectangular shape, or other shape like stretching both sides of the holding portion 9 that can hold the light shielding member 2a. In any case, the light path 4a should not be blocked.

Figure 3:
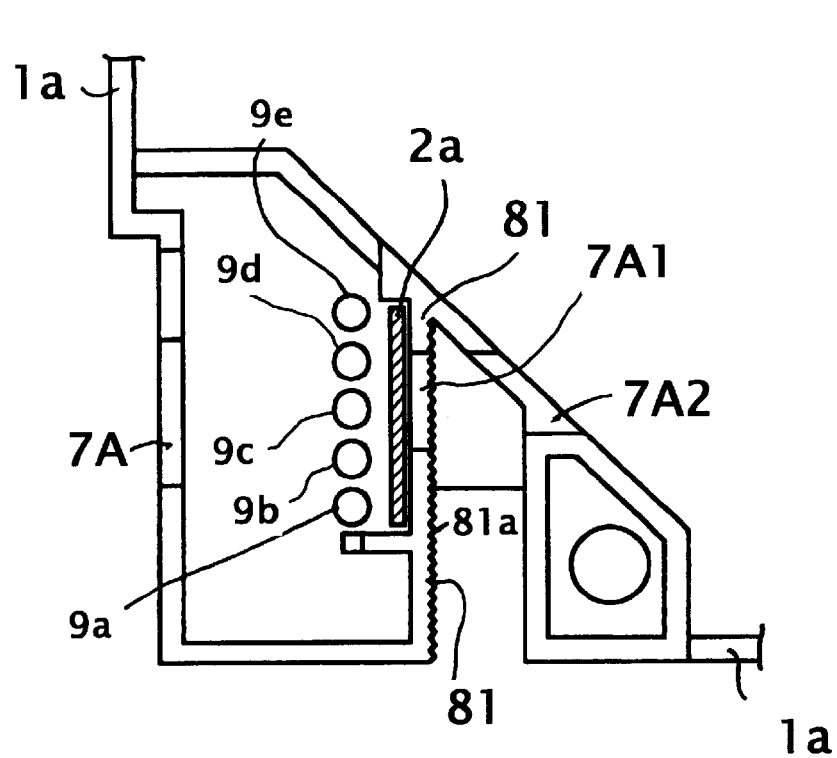
FIG. 3 is a plan view of another holding portion of the tape cassette according to the first embodiment of the present invention.

FIG. 3 is a plan view of another holding portion of the tape cassette according to the first embodiment of the present invention. FIG. 3 shows a plurality of columnar shaped holding portions 9a through 9e instead of one holding portion 9 shown in FIG. 1 and the rib 81 has a triangular shaped prism on the other side where the holding portions 9a through 9e stand. The holding portions 9a through 9e constitute the functionality of the holding portion 9 and the holding member 12 in FIG. 1. For example, the holding portions 9a and 9e in both sides end will hold a light shielding member 2a from each side, and the remaining three holding portions 9b through 9d hold the light shielding member 2a from the back. In any case, the height of each holding portion 9a through 9e should not block the light window 11a but all of the holding members should not necessary to be the same height. If the light shielding member 2a is rather thick, then the holding portions 9a and 9e at both sides are preferably having the height taller than the half of the thickness "T" of the tape cassette.

The prism 81a is molded together with the lower half 1a of the tape cassette and the size of the prism is 0.35 mm in height and 0.15 mm in width.

[Second Embodiment]

Figure 4:
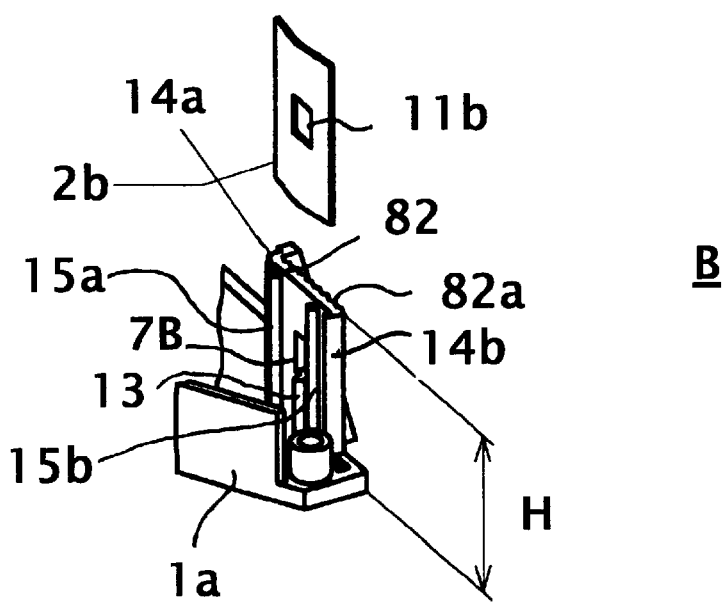
FIG. 4 is a perspective view of a substantial portion of the lower half of the tape cassette according to a second embodiment of the present invention, wherein a light shield is placed.

FIG. 4 is a perspective view of a substantial part of the lower half of the tape cassette according to a second embodiment of the present invention, wherein a light shielding member is placed. FIG. 4 also corresponds to the portion B shown in FIG. 9.

In FIG. 4, a portion B of the lower half 1a comprises a rib 82 molded in the lower half 1a, a light exit 7B formed on the rib 82 for passing the light emitted from a light source not shown to a light sensor not shown, a prisms 82a of which cross-sectional view is a triangular shaped, formed on the other side (outer side is which opposed to the light sensor) of the rib 82, a pair of protrusions 14a and 14b to fix a side position of a light shielding member 2b having a light window 11b to be inserted to the rib 82, a protrusion 13 formed with the rib 82 for holding the center position of the light shielding member 2b, two columnar holding members 15a and 15b for holding the light shielding member 2b by the sides thereof. The light shielding member 2b is made of a flexible plastic or thinner metal plate that it flexes at the holding position of the rib 82.

Figure 5:
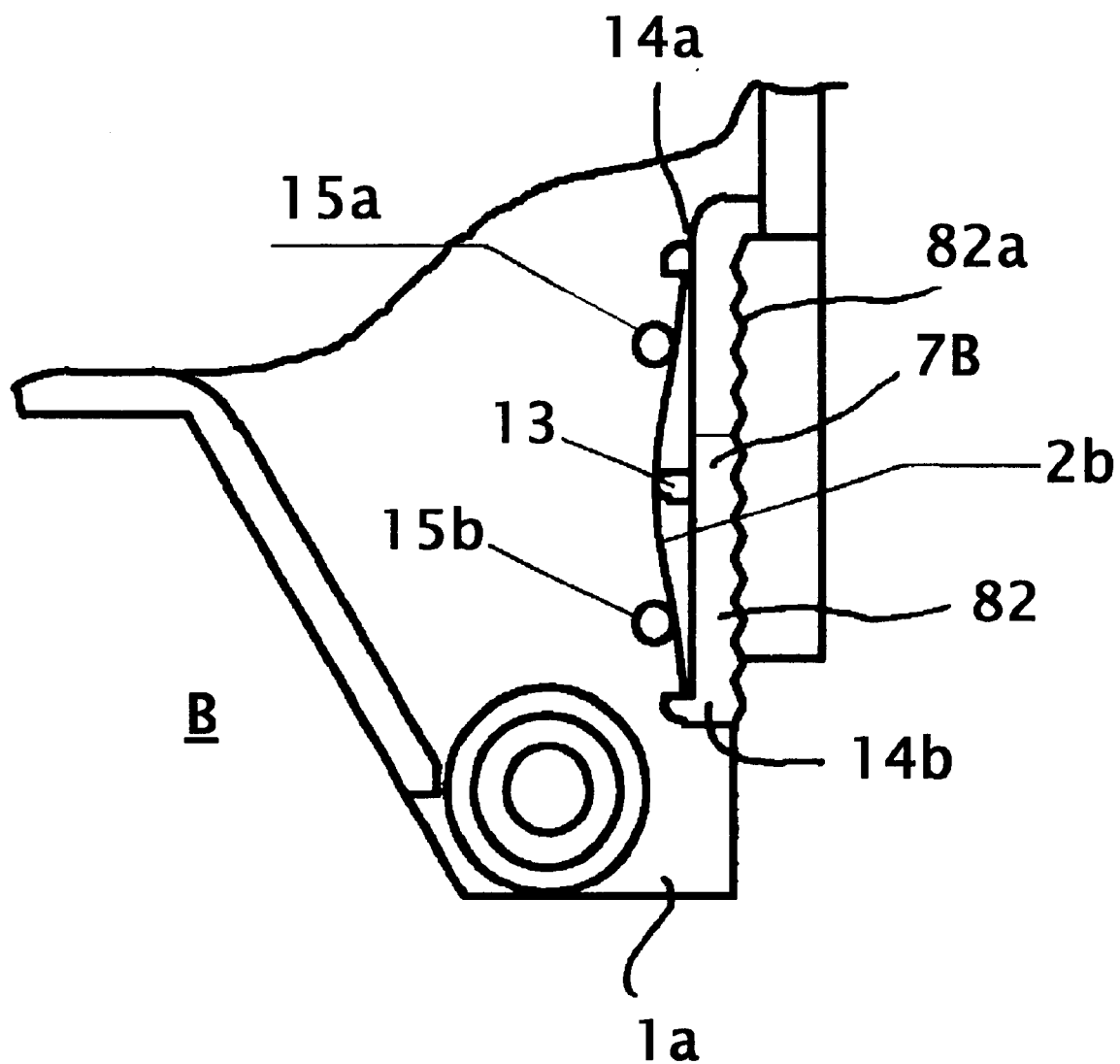
FIG. 5 is a plan view of a substantial portion of the lower half of the tape cassette according to the second embodiment of the present invention, wherein a light shield is placed.

FIG. 5 is a plan view of a substantial portion B of the lower half 1a of the tape cassette according to the second embodiment hereof, wherein the light shielding member 2b is placed. In FIG. 5, the light shielding member 2b is held by the protrusions 13, 14a, 14b and the columnar holding members 15a and 15b. The protrusions 14a and 14b hold both sides of the member 2b, and the protrusion 13 holds the member 2b approximately at the center position of the rib 82 and the columnar holding members 15a and 15b hold the member 2b from the other side that the member 2b flexes to be fixed at the holding position of the rib 82.

Further, the rib 82 is desirably having a height taller than the half of thickness "T" of the tape cassette in both sides of the light exit 7B as shown in FIG. 4 but the rib 82 may have an uneven height in relation to the light exit 7B, i.e. one side taller than the other.

The prism 82a has a height of 0.3 mm, a width of 0.5 mm and is formed vertically as a part of the lower half 1a on the side of the rib 82 opposed to the light sensor not shown.

[Third Embodiment]

Figure 6:
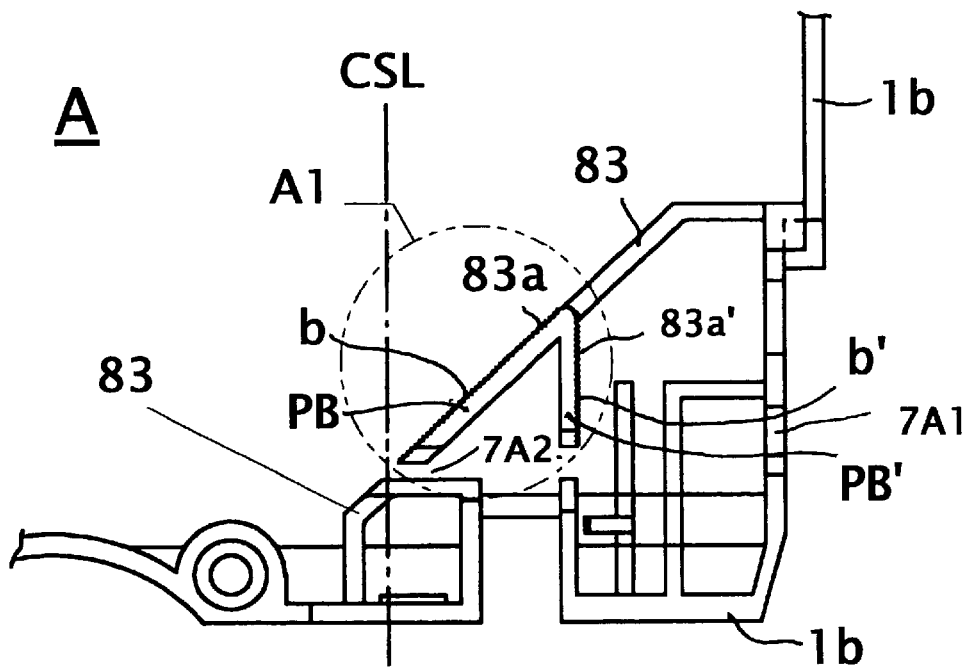
FIG. 6 (A) is a plan view of a V-shaped rib according to a third embodiment of the present invention.
Figure 6:
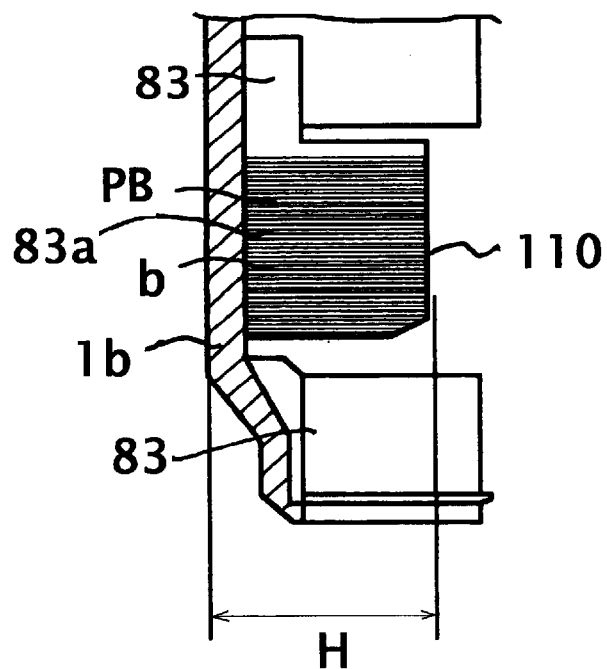

FIG. 6 (A) is a plan view of a V-shaped rib according to a third embodiment. FIG. 6 (A) corresponds to the portion of upper half of the tape cassette shown as the portion A in FIG. 9.

In FIG. 6 (A), the portion A of an upper half 1b of the tape cassette comprises a rib 83 to be fitted with the rib 81 in the lower half 1a not shown, V-shaped ribs PB and PB' having a plurality of tiny prisms 83a of which cross-sectional view is a triangular shape on a side b of the rib PB and a side b' of the rib PB' respectively, a light exit 7A1 for fitting with the light exit 7A formed in the lower half 1a to pass the light emitted from the light source not shown through the light sensor not shown for detection of the tape end.

FIG. 6 (B) is an elevational view of the circled area A1 of the V-shaped rib shown in FIG. 6 (A). As shown in FIG. 6 (B), the rib 83 is having a rib PB which surface b is formed with a plurality of prism 83a on the upper half 1b so that the amount of irregular light passing through the upper half 1b and radiating from the edge 110 of the rib PB can be minimized.

Figure 7:
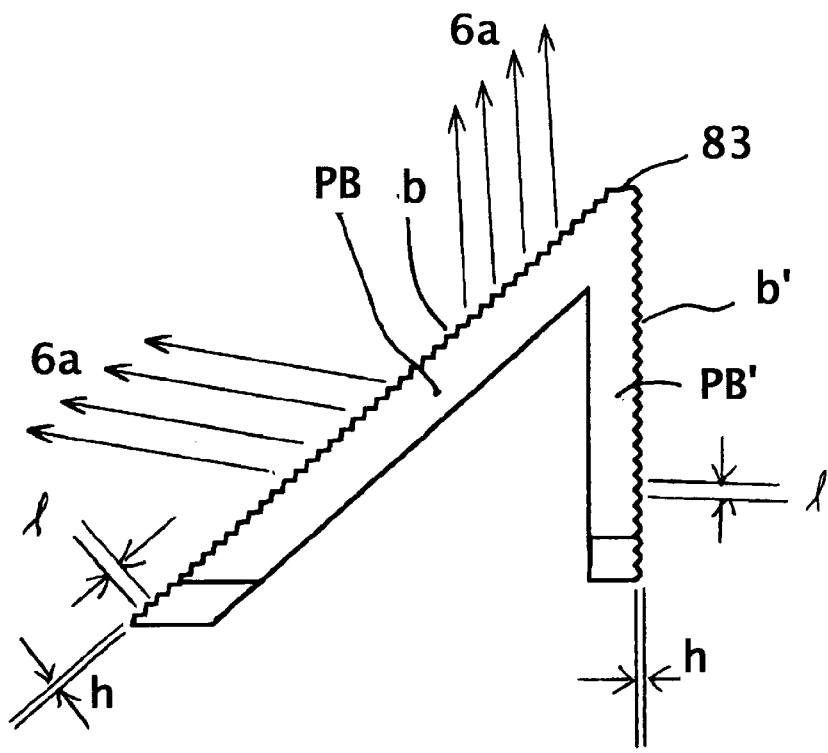
FIG. 7 is a cross-sectional view of the V-shaped rib with enlarging a circle area A1 shown in FIG. 6 (A) according to the present invention.

FIG. 7 is a cross-sectional view of a V-shaped rib for explaining the light being radiated from the rib according to the present invention. The light being emitted from the light source will pass through the inside of the tape cassette combined by the upper or lower half. In the case that the upper and the lower half are made of transparent or semi-transparent material, as described above, the light passes through the upper and lower halves 1b and 1a. The light passing through the upper half 1b is radiated from the edge 110 of the rib 83 which constitutes an irregular light 6a and it will reach to the light sensor through the light exit 7A as explained above. As the V-shaped rib (PB, PB') has the prism 83a, such the irregular light 6a will be radiated from the surface of the prism 83a (i.e. the direction of the arrow shown in FIG. 7). The prism 83a has a height "h" of 0.15 mm and width "1" of 0.35 mm.

Figure 8:
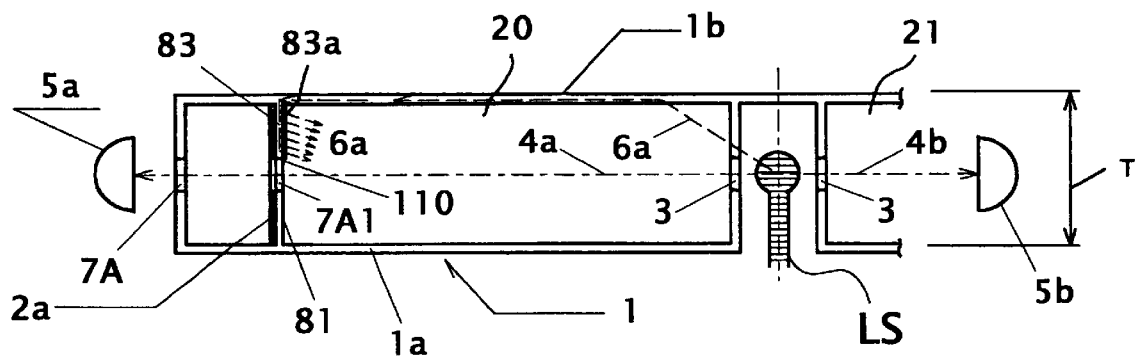
FIG. 8 is a cross sectional view of a tape cassette having a light shield and a rib according to the present invention.

FIG. 8 is a cross sectional view of a tape cassette having a light shield and a rib according to the present invention. In FIG. 8, the tape cassette is composed of an upper half 1b and a lower half 1a, a light hole 3 for inserting a light source LS incorporated in the VCR, a rib 83 for having a prism 83a and an edge 110, a light shielding member 2a for passing only the straight light emitted from the light source LS, a light exit 7A, 7B for passing the light emitted from the light source LS, a light sensor 5a incorporated in the VCR for receiving the light emitted from the light source LS, a room 20 for incorporating a TU reel not shown, another room 21 for incorporating a SP reel not shown. Although it is not shown in FIG. 8 but the magnetic tape is connected with the TU reel and SP reel and is supplied from the SP reel through the predetermined tape travel path across the light path between the light source and the rib 8 inside the tape cassette and winded by the TU reel.

As the upper half 1b and lower half 1a of the tape cassette are made of transparent or semi-transparent material, some of the light emitted from the light source LS in the light hole 3, will pass through the upper and lower half 1b and 1a as the irregular light 6a. As the rib 83 has a plurality of prisms 83a, most of the irregular light 6a will be radiated in the air (i.e. the direction of the arrow shown in FIG. 8) before it reaches the edge 110 of the rib 83. Eventually, the lesser irregular light 6a reaches the light sensor 5a and the error detection of the tape end by receiving the irregular light can be prevented. In addition, as the rib 83 is formed in V-shape having the ribs PB and PB' as shown in FIG. 6 (A), the prism 83a for radiating the irregular light can be formed in wider area to less the amount of the irregular light 6a reaching the light sensor 5a. Further, the V-shaped rib can provide more strength of the tape cassette housing it self.

As described above, the rib of the upper half 1b and the lower half 1a of the tape cassette having a plurality of prisms 83a can minimize the irregular light 6a passing through the transparent or semi-transparent material of the upper and the lower halves (1b, 1a), and accordingly, the error detection of the tape end by receiving such the irregular light 6a can be prevented.

As the rib of the upper and lower half is formed in V-shape for having a plurality of prisms 83a on the surfaces b, b' of the ribs PB, PB', the large amount of the irregular light can be prevented from reaching to the light sensor 5a and the strength of the tape cassette can be maintained.

The present invention is described in the case of a "VHS" format tape cassette. However, it is not limited to such the format but it may also applies to any other format having a light detection system for detecting the tape end and other type of tape cassette having a transparent or semi-transparent upper and lower half.

Further, it is obvious that the present invention can be utilized for a tape cassette having a transparent or semi-transparent housing of either upper or lower half.

What is claimed is:

1. A magnetic tape cassette used in an apparatus having a light source and a light sensor for detecting a tape end of a magnetic tape being loaded therein, the magnetic tape cassette comprising:

a cassette housing being formed by combining an upper half and a lower half made of transparent or semi-transparent material, wherein the cassette housing is equipped with a reel being connected to the magnetic tape through an intermediary leader tape having higher light transmittance than the magnetic tape for winding up the magnetic tape;

a light exit being opposed to the light sensor when the magnetic tape cassette is loaded to a predetermined position in the apparatus, for passing light from the light source to the light sensor through the light exit, wherein a light path of the light emitted from the light source crosses a travel path of the magnetic tape;

a rib being formed in the upper half and the lower half wherein a plurality of triangular shaped prisms are formed serially on at least one side surface of the rib placed between the light source and the light exit; and a light-shielding member formed separately from the rib and placed contiguous to the rib, having a light window for passing the light emitted from the light source through the light exit.

2. The magnetic tape cassette as claimed in claim 1, wherein the rib formed contiguous to the light exit has a generally V-shape.

* * * * *